US006751941B2

(12) United States Patent
Edelman et al.

(10) Patent No.: US 6,751,941 B2
(45) Date of Patent: Jun. 22, 2004

(54) FOIL BEARING ROTARY FLOW COMPRESSOR WITH CONTROL VALVE

(75) Inventors: Edward C. Edelman, Agoura Hills, CA (US); Joel Wacknov, Thousand Oaks, CA (US); Brian J. Budzyn, Thousand Oaks, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 10/080,179

(22) Filed: Feb. 19, 2002

(65) Prior Publication Data

US 2002/0124571 A1 Sep. 12, 2002

Related U.S. Application Data

(60) Provisional application No. 60/269,544, filed on Feb. 16, 2001.

(51) Int. Cl.[7] .................................................. F02C 3/22

(52) U.S. Cl. ...................... 60/39.281; 417/29; 417/44.1

(58) Field of Search ......................... 60/39.281; 417/29, 417/44.1

(56) References Cited

U.S. PATENT DOCUMENTS 3,638,422 A * 2/1972 Loft et al. ............... 60/39.281
3,639,076 A * 2/1972 Rowen .................... 60/39.281
5,487,266 A * 1/1996 Brown .................... 60/39.281
5,606,853 A * 3/1997 Birch et al. .............. 60/39.281
5,752,380 A 5/1998 Bosley et al.
5,819,524 A 10/1998 Bosley et al.
5,850,733 A 12/1998 Bosley et al.
5,873,235 A 2/1999 Bosley et al.
6,070,404 A 6/2000 Bosley et al.
6,175,210 B1 * 1/2001 Schwartz et al. ............. 60/608
6,192,668 B1 2/2001 Mackay
6,381,944 B2 5/2002 Mackay
6,405,522 B1 * 6/2002 Pont et al. ............... 60/39.281
6,484,490 B1 * 11/2002 Olsen et al. ............. 60/39.281

* cited by examiner

*Primary Examiner*—Michael Koczo
(74) *Attorney, Agent, or Firm*—Sterne, Kessler, Goldstein & Fox P.L.L.C.

(57) ABSTRACT

A fuel delivery system supplies fuel to a turbogenerator or to another heat engine. A fuel delivery system according to the present disclosure may include a fuel compressor, a fuel control valve, and a fuel flow controller. A fuel delivery system may have multiple modes of control permitting independent and simultaneous control by the compressor and the fuel valve. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

6 Claims, 12 Drawing Sheets

| TRANSITION | BEGIN STATE | END STATE | OCCURS WHEN |
|---|---|---|---|
| 406 | POWER UP | VALVE MODE | POWER UP |
| 411 | VALVE MODE | DUAL MODE | MEASURED TEMPERATURE < SECONDARY SETPOINT 515C |
| 412 | DUAL MODE | VALVE MODE | MEASURED TEMPERATURE >= SECONDARY SETPOINT 515C |
| 415 | DUAL MODE | COMPRESSOR MODE | FUEL CONTROL VALVE REACHES MAX LIMIT 340A |
| 421 | COMPRESSOR MODE | DUAL MODE | MEASURED TEMPERATURE > SECONDARY SETPOINT 515 |
| 422 | DUAL MODE | COMPRESSOR MODE | MEASURED TEMPERATURE <= SECONDARY SETPOINT 515 |
| 425 | DUAL MODE | VALVE MODE | FUEL COMPRESSOR SPEED <= MINIMUM SPEED LIMIT AND MEASURED TEMPERATURE > SECONDARY SETPOINT 515 |

FIG.4B

FOIL BEARING ROTARY FLOW COMPRESSOR WITH CONTROL VALVE

RELATED APPLICATIONS

This application claims the priority of U.S. provisional patent application Serial No. 60/269,544 filed Feb. 16, 2001.

BACKGROUND OF THE INVENTION

1. Field of the Invention

This invention relates to heat engines including turbogenerators used for power generation and more specifically to fuel delivery techniques for small turbogenerators.

2. Description of the Prior Art

Conventional fuel delivery systems for small heat engines typically incorporate piston type compressors that are controlled according to the pressure of the fuel exiting the compressor.

What is needed is an economic and reliable fuel delivery system that can be integrated with the heat engine to deliver fuel flows supporting a wide operating range.

SUMMARY OF THE INVENTION

A fuel delivery system according to the present disclosure may include a compressor and a fuel valve having a controllable actuator for regulating fuel flow from the compressor, one or more feedback elements providing one or more control signals and a fuel controller receiving control signals from the one or more feedback elements, controlling the compressor speed and fuel valve position.

BRIEF DESCRIPTION OF THE DRAWINGS

FIG. 4B is a mode transition table for the mode transition diagram of FIG. 4A.

DETAILED DESCRIPTION OF THE PREFERRED EMBODIMENT(S)

Figure 1A:
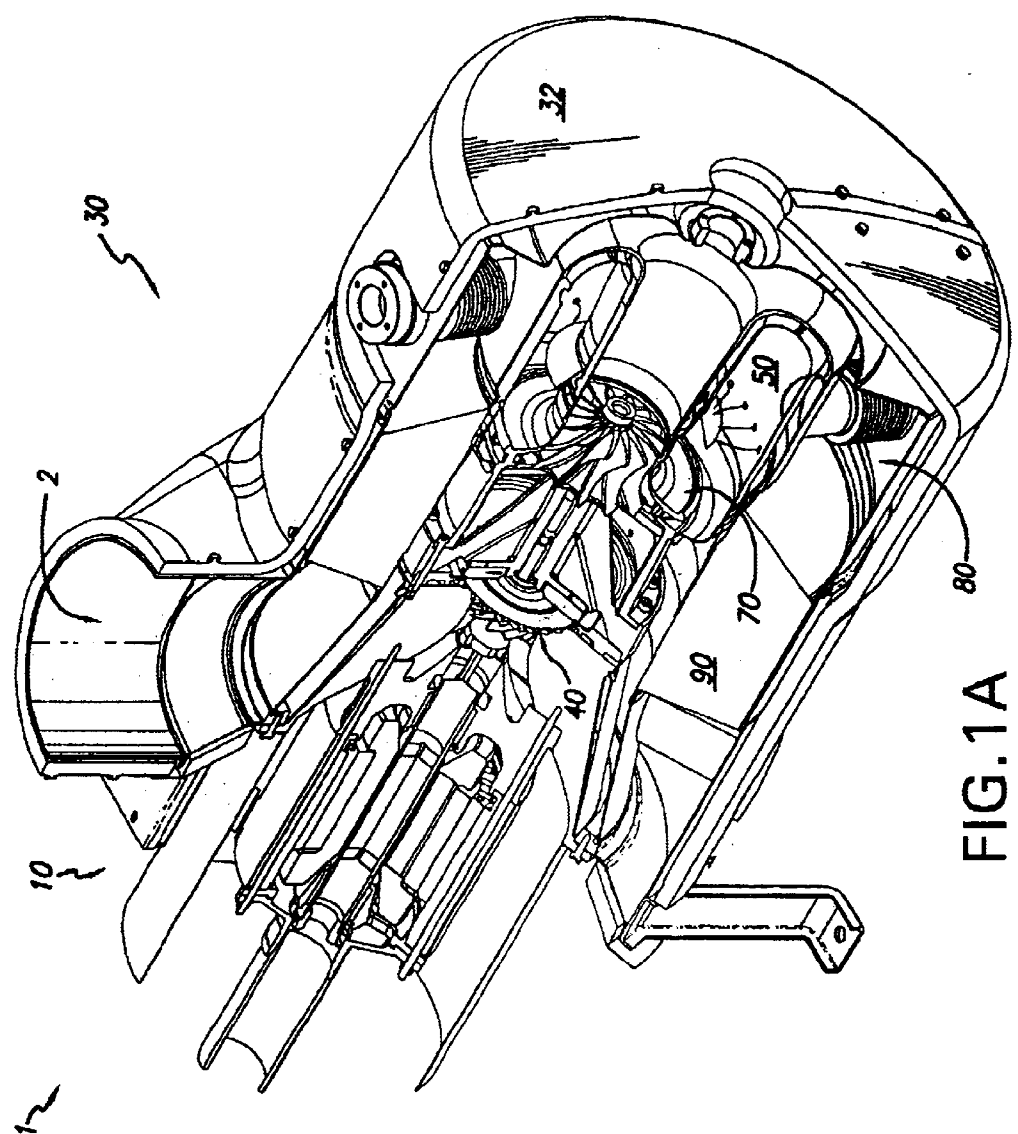
FIG. 1A is perspective view, partially in section, of an integrated turbogenerator system.

With reference to FIG. 1A, an integrated turbogenerator 1 according to the present disclosure generally includes motor/generator section 10 and compressor-turbine section 30. Compressor—turbine section 30 includes exterior can 32, compressor 40, combustor 50 and turbine 70. A recuperator 90 may be optionally included.

Figure 1B:
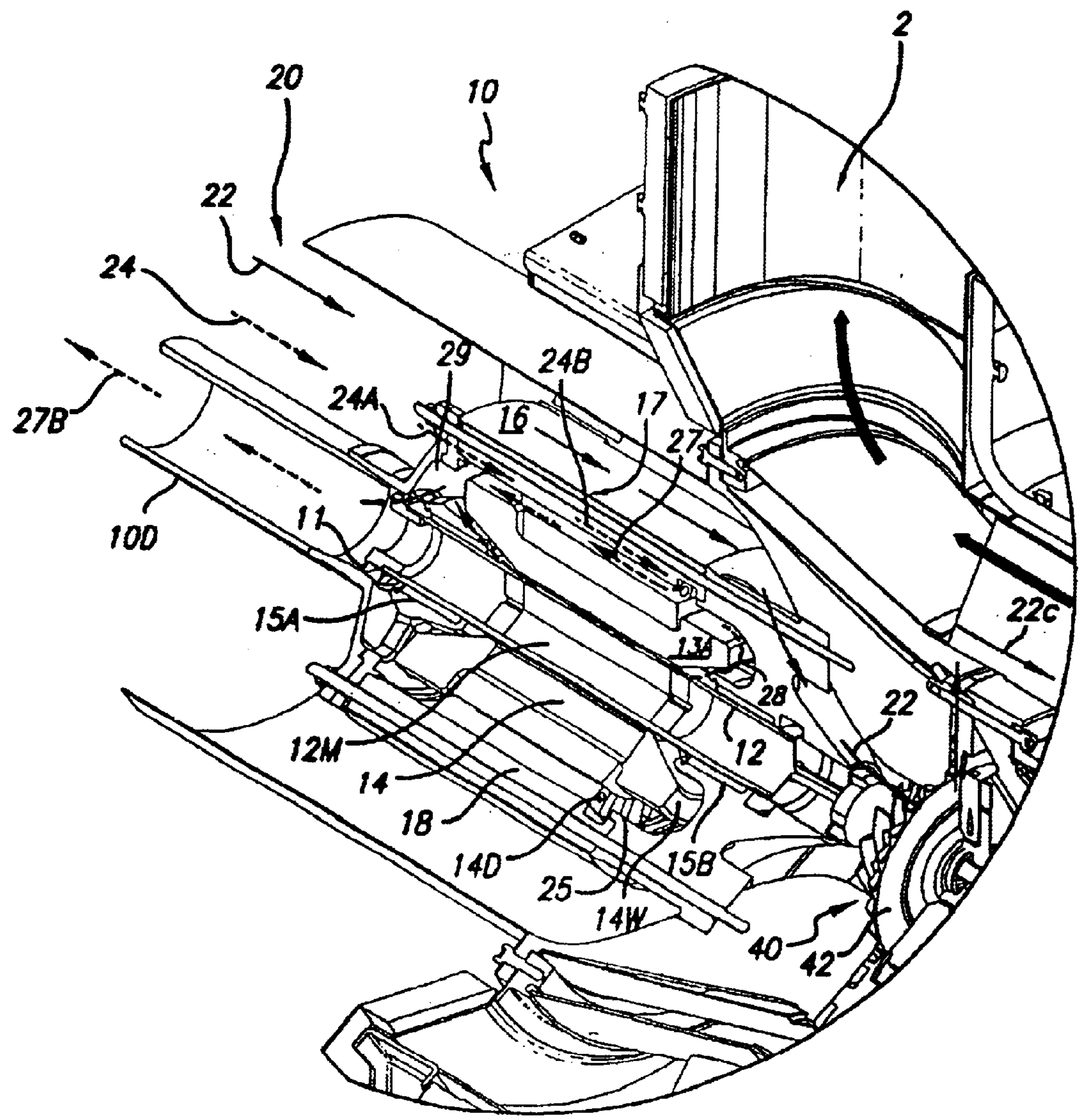
FIG. 1B is a magnified perspective view, partially in section, of the motor/generator portion of the integrated turbogenerator of FIG. 1A.
Figure 1C:
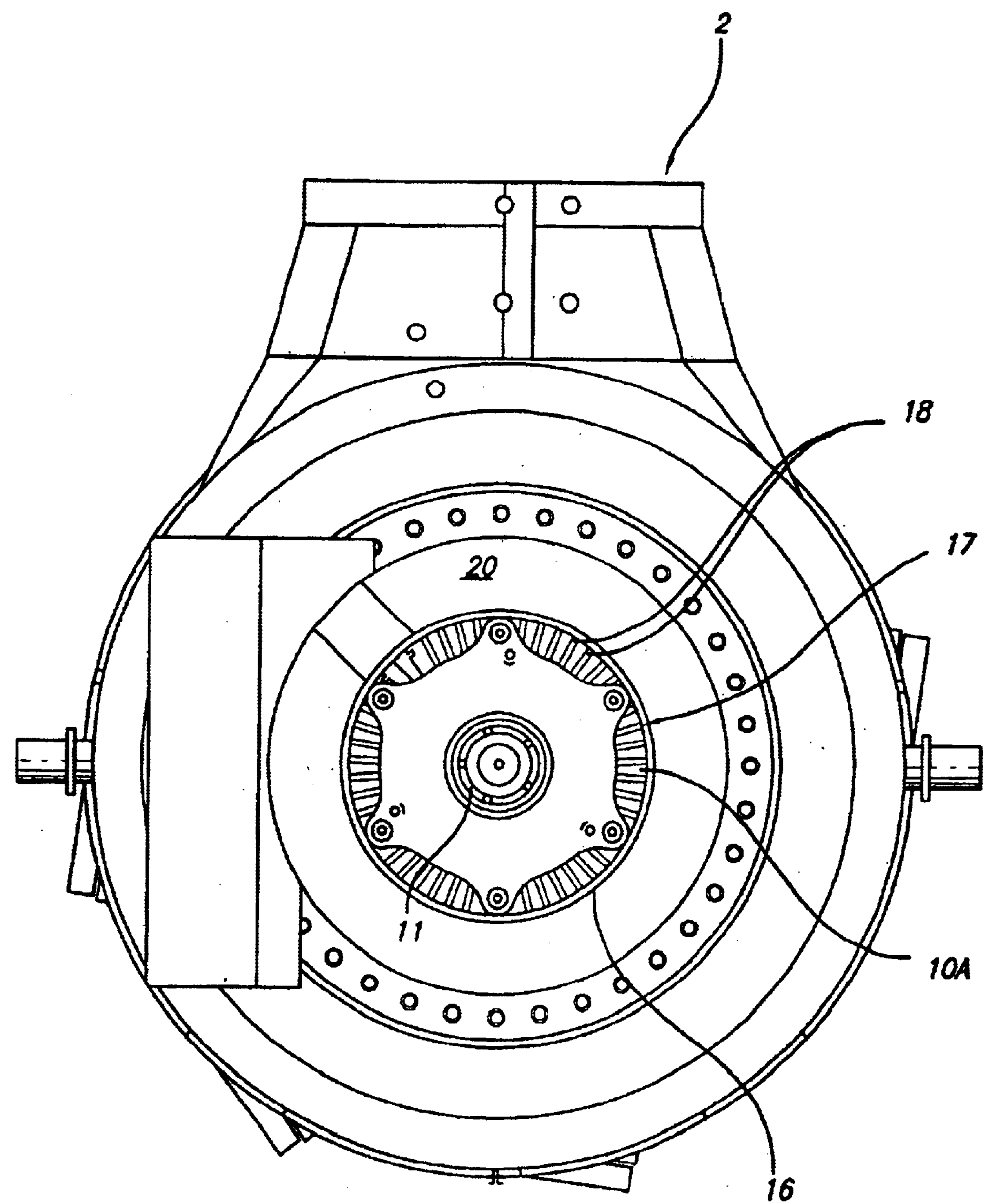
FIG. 1C is an end view, from the motor/generator end, of the integrated turbogenerator of FIG. 1A.

Referring now to FIG. 1B and FIG. 1C, in a currently preferred embodiment of the present disclosure, motor/generator section 10 may be a permanent magnet motor generator having a permanent magnet rotor or sleeve 12. Any other suitable type of motor generator may also be used. Permanent magnet rotor or sleeve 12 may contain a permanent magnet 12M. Permanent magnet rotor or sleeve 12 and the permanent magnet disposed therein are rotatably supported within permanent magnet motor/generator stator 14. Preferably, one or more compliant foil, fluid film, radial, or journal bearings 15A and 15B rotatably support permanent magnet rotor or sleeve 12 and the permanent magnet disposed therein. All bearings, thrust, radial or journal bearings, in turbogenerator 1 may be fluid film bearings or compliant foil bearings. Motor/generator housing 16 encloses stator heat exchanger 17 having a plurality of radially extending stator cooling fins 18. Stator cooling fins 18 connect to or form part of stator 14 and extend into annular space 10A between motor/generator housing 16 and stator 14. Wire windings 14W exist on permanent magnet motor/generator stator 14.

Figure 1D:
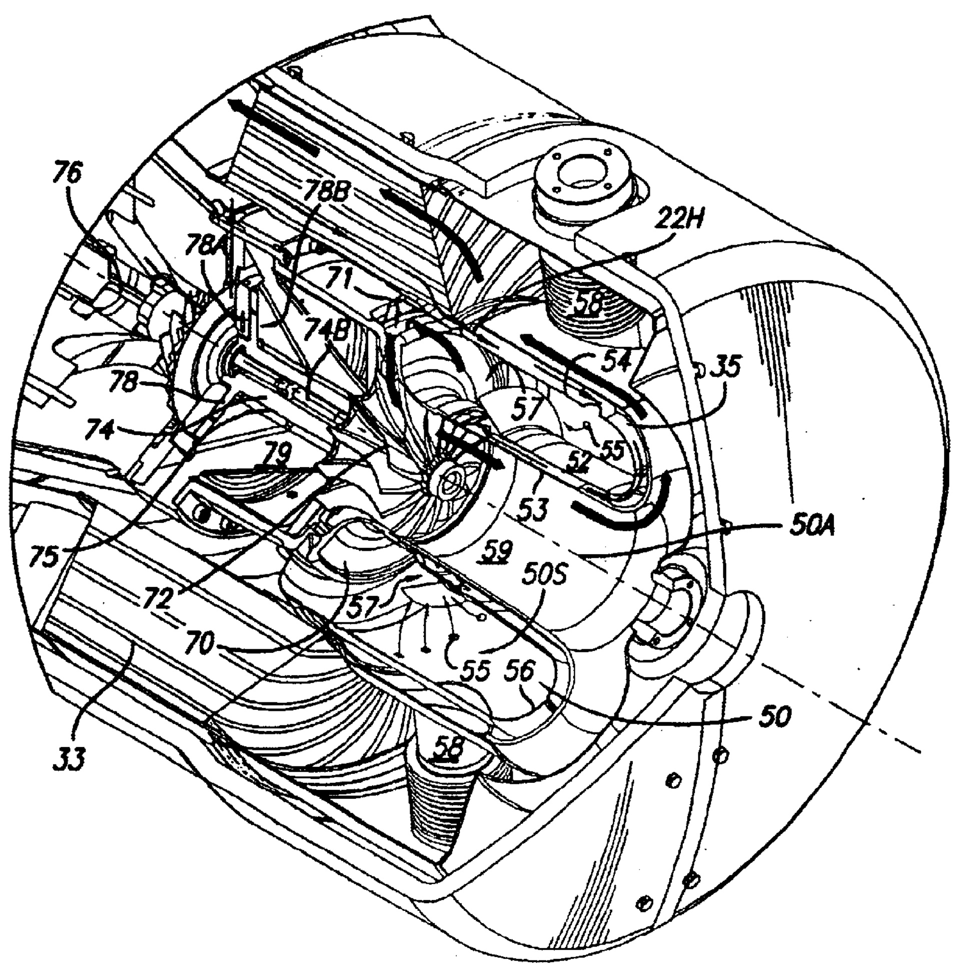
FIG. 1D is a magnified perspective view, partially in section, of the combustor-turbine exhaust portion of the integrated turbogenerator of FIG. 1A.
Figure 2:
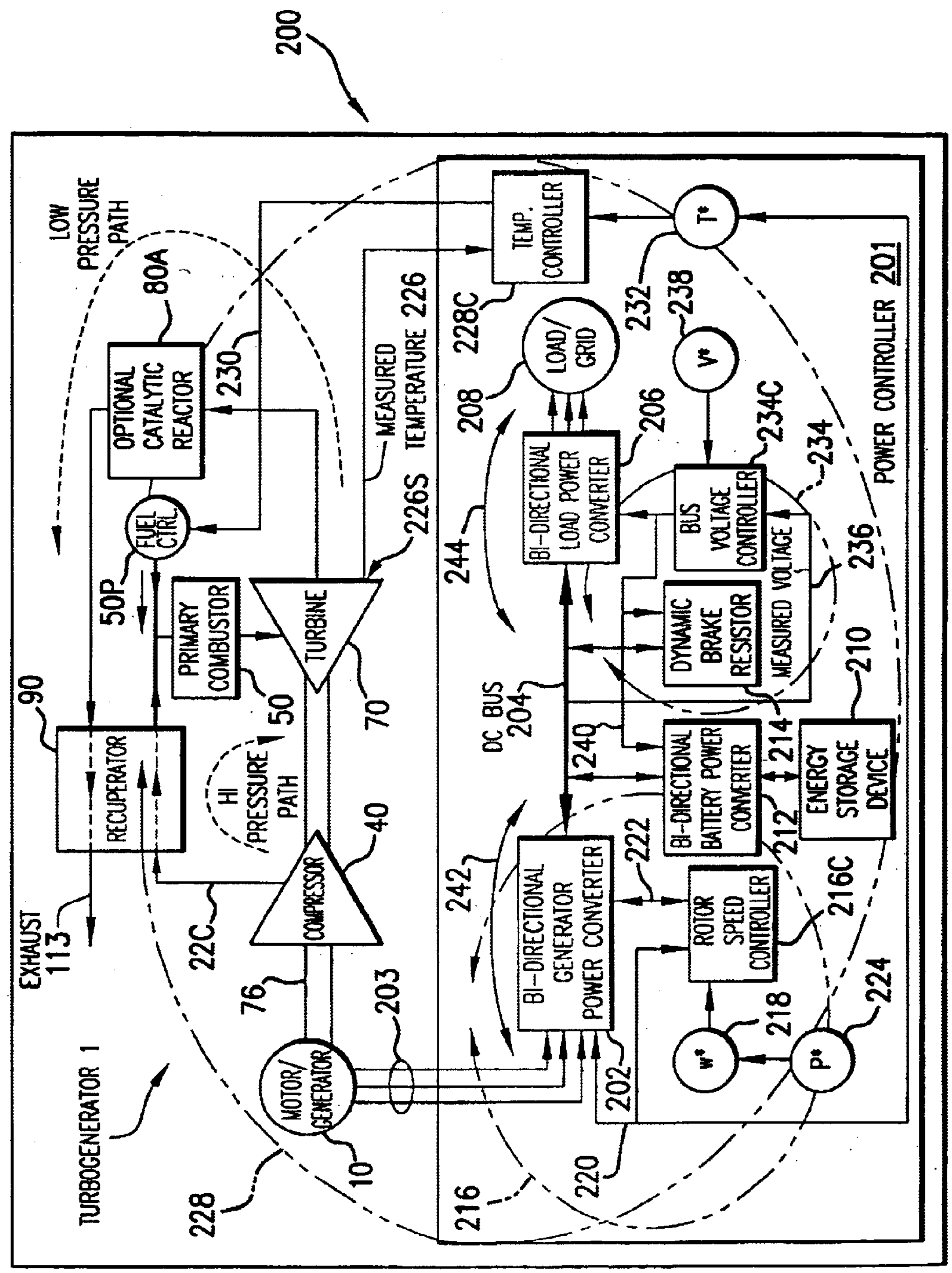
FIG. 2 is a block diagram schematic of a turbogenerator system including a power controller having decoupled rotor speed, operating temperature, and DC bus voltage control loops.

Referring now to FIG. 1D, combustor 50 may include cylindrical inner wall 52 and cylindrical outer wall 54. Cylindrical outer wall 54 may also include air inlets 55. Cylindrical walls 52 and 54 define an annular interior space 50S in combustor 50 defining an axis 50A. Combustor 50 includes a generally annular wall 56 further defining one axial end of the annular interior space of combustor 50. Associated with combustor 50 may be one or more fuel injector inlets 58 to accommodate fuel injectors which receive fuel from fuel control element 50P as shown in FIG. 2, and inject fuel or a fuel air mixture to interior of 50S combustor 50. Inner cylindrical surface 53 is interior to cylindrical inner wall 52 and forms exhaust duct 59 for turbine 70.

Turbine 70 may include turbine wheel 72. An end of combustor 50 opposite annular wall 56 further defines an aperture 71 in turbine 70 exposed to turbine wheel 72. Bearing rotor 74 may include a radially extending thrust bearing portion, bearing rotor thrust disk 78, constrained by bilateral thrust bearings 78A and 78B. Bearing rotor 74 may be rotatably supported by one or more journal bearings 75 within center bearing housing 79. Bearing rotor thrust disk 78 at the compressor end of bearing rotor 74 is rotatably supported preferably by a bilateral thrust bearing 78A and 78B. Journal or radial bearing 75 and thrust bearings 78A and 78B may be fluid film or foil bearings.

Turbine wheel 72, bearing rotor 74 and compressor impeller 42 may be mechanically constrained by tie bolt 74B, or other suitable technique, to rotate when turbine wheel 72 rotates. Mechanical link 76 mechanically constrains compressor impeller 42 to permanent magnet rotor or sleeve 12 and the permanent magnet disposed therein causing permanent magnet rotor or sleeve 12 and the permanent magnet disposed therein to rotate when compressor impeller 42 rotates.

Figure 1E:
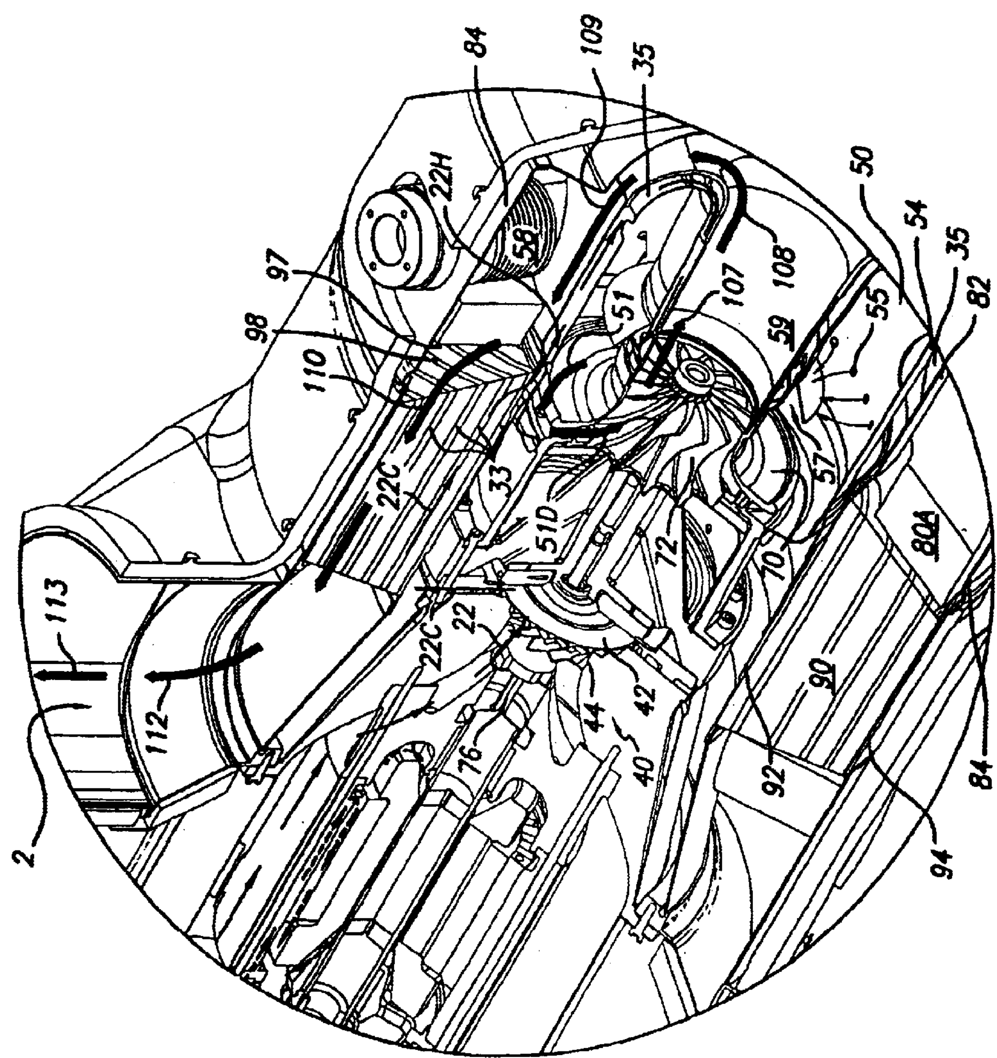
FIG. 1E is a magnified perspective view, partially in section, of the compressor-turbine portion of the integrated turbogenerator of FIG. 1A.

Referring now to FIG. 1E, compressor 40 may include compressor impeller 42 and compressor impeller housing 44. Recuperator 90 may have an annular shape defined by cylindrical recuperator inner wall 92 and cylindrical recuperator outer wall 94. Recuperator 90 contains internal passages for gas flow, one set of passages, passages 33 connecting from compressor 40 to combustor 50, and one set of passages, passages 97, connecting from turbine exhaust 80 to turbogenerator exhaust output 2.

Referring again to FIG. 1B and FIG. 1C, in operation, air flows into primary inlet 20 and divides into compressor air 22 and motor/generator cooling air 24. Motor/generator cooling air 24 flows into annular space 10A between motor/generator housing 16 and permanent magnet motor/generator stator 14 along flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17 into stator cavity 25 where it further divides into stator return cooling air 27 and rotor cooling air 28. Rotor cooling air 28 passes around stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in stator cavity 29 and are drawn out of the motor/generator 10 by exhaust fan 11 which is connected to rotor or sleeve 12 and rotates with rotor or sleeve 12. Exhaust air 27B is conducted away from primary air inlet 20 by duct 10D.

Referring again to FIG. 1E, compressor 40 receives compressor air 22. Compressor impeller 42 compresses compressor air 22 and forces compressed gas 22C to flow into a set of passages 33 in recuperator 90 connecting compressor 40 to combustor 50. In passages 33 in recuperator 90, heat is exchanged from walls 98 of recuperator 90 to compressed gas 22C. As shown in FIG. 1E, heated compressed gas 22H flows out of recuperator 90 to space 35 between cylindrical inner surface 82 of turbine exhaust 80 and cylindrical outer wall 54 of combustor 50. Heated compressed gas 22H may flow into combustor 54 through sidewall ports 55 or main inlet 57. Fuel (not shown) may be reacted in combustor 50, converting chemically stored energy to heat. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, and then radially outward, and then axially in a direction toward permanent magnet motor/generator section 10 to passages 97 of recuperator 90, as indicated by gas flow arrows 108 and 109 respectively.

In an alternate embodiment of the present disclosure, low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed on them. Low pressure catalytic reactor 80A may have a generally annular shape defined by cylindrical inner surface 82 and cylindrical low pressure outer surface 84. Unreacted and incompletely reacted hydrocarbons in gas in low pressure catalytic reactor 80A react to convert chemically stored energy into additional heat, and to lower concentrations of partial reaction products, such as harmful emissions including nitrous oxides (NOx).

Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1, as indicated by gas flow arrow 113. Gas flowing through passages 97 in recuperator 90 connecting from turbine exhaust 80 to outside of turbogenerator 1 exchanges heat to walls 98 of recuperator 90. Walls 98 of recuperator 90 heated by gas flowing from turbine exhaust 80 exchange heat to gas 22C flowing in recuperator 90 from compressor 40 to combustor 50.

Turbogenerator 1 may also include various electrical sensor and control lines for providing feedback to power controller 201 and for receiving and implementing control signals as shown in FIG. 2.

Alternative Mechanical Structural Embodiments of the Integrated Turbogenerator

The integrated turbogenerator disclosed above is exemplary. Several alternative structural embodiments are known.

In one alternative embodiment, air 22 may be replaced by a gaseous fuel mixture. In this embodiment, fuel injectors may not be necessary. This embodiment may include an air and fuel mixer upstream of compressor 40.

In another alternative embodiment, fuel may be conducted directly to compressor 40, for example by a fuel conduit connecting to compressor impeller housing 44. Fuel and air may be mixed by action of the compressor impeller 42. In this embodiment, fuel injectors may not be necessary.

In another alternative embodiment, combustor 50 may be a catalytic combustor.

In still another alternative embodiment, geometric relationships and structures of components may differ from those shown in FIG. 1A. Permanent magnet motor/generator section 10 and compressor/combustor section 30 may have low pressure catalytic reactor 80A outside of annular recuperator 90, and may have recuperator 90 outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annularly shaped recuperator 90, or a recuperator 90 shaped to substantially enclose both combustor 50 and low pressure catalytic reactor 80A on all but one face.

An integrated turbogenerator is a turbogenerator in which the turbine, compressor, and generator are all constrained to rotate based upon rotation of the shaft to which the turbine is connected. The methods and apparatus disclosed herein are preferably but not necessarily used in connection with a turbogenerator, and preferably but not necessarily used in connection with an integrated turbogenerator.

Control System

Referring now to FIG. 2, a preferred embodiment is shown in which a turbogenerator system 200 includes power controller 201 which has three substantially decoupled control loops for controlling (1) rotary speed, (2) temperature, and (3) DC bus voltage. A more detailed description of an appropriate power controller is disclosed in U.S. patent application Ser. No. 09/207,817, filed Dec. 8, 1998 in the names of Gilbreth, Wacknov and Wall, and assigned to the assignee of the present application which is incorporated herein in its entirety by this reference.

Referring still to FIG. 2, turbogenerator system 200 includes integrated turbogenerator 1 and power controller 201. Power controller 201 includes three decoupled or independent control loops.

A first control loop, temperature control loop 228, regulates a temperature related to the desired operating temperature of primary combustor 50 to a set point, by varying fuel flow from fuel control element 50P to primary combustor 50. Temperature controller 228C receives a temperature set point, T*, from temperature set point source 232, and receives a measured temperature from temperature sensor 226S connected to measured temperature line 226. Temperature controller 228C generates and transmits over fuel control signal line 230 to fuel pump 50P a fuel control signal for controlling the amount of fuel supplied by fuel pump 50P to primary combustor 50 to an amount intended to result in a desired operating temperature in primary combustor 50. Temperature sensor 226S may directly measure the temperature in primary combustor 50 or may measure a temperature of an element or area from which the temperature in the primary combustor 50 may be inferred.

A second control loop, speed control loop 216, controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. Bi-directional generator power converter 202 is controlled by rotor speed controller 216C to transmit power or current in or out of motor/generator 10, as indicated by bi-directional arrow 242. A sensor in turbogenerator 1 senses the rotary speed on the common shaft and transmits that rotary speed signal over measured speed line 220. Rotor speed controller 216 receives the rotary speed signal from measured speed line 220 and a rotary speed set point signal from a rotary speed set point source 218. Rotary speed controller 216C generates and transmits to generator power converter 202 a power conversion control signal on line 222 controlling generator power converter 202's transfer of power or current between AC lines 203 (i.e., from motor/generator 10) and DC bus 204. Rotary speed set point source 218 may convert to the rotary speed set point a power set point P* received from power set point source 224.

A third control loop, voltage control loop 234, controls bus voltage on DC bus 204 to a set point by transferring power or voltage between DC bus 204 and any of (1) Load/Grid 208 and/or (2) energy storage device 210, and/or (3) by transferring power or voltage from DC bus 204 to dynamic brake resistor 214. A sensor measures voltage DC bus 204 and transmits a measured voltage signal over measured voltage line 236. Bus voltage controller 234C receives the measured voltage signal from voltage line 236 and a voltage set point signal V* from voltage set point source 238. Bus voltage controller 234C generates and transmits signals to bi-directional load power converter 206 and bi-directional battery power converter 212 controlling their transmission of power or voltage between DC bus 204, load/grid 208, and energy storage device 210, respectively. In addition, bus voltage controller 234 transmits a control signal to control connection of dynamic brake resistor 214 to DC bus 204.

Power controller 201 regulates temperature to a set point by varying fuel flow, adds or removes power or current to motor/generator 10 under control of generator power converter 202 to control rotor speed to a set point as indicated by bi-directional arrow 242, and controls bus voltage to a set point by (1) applying or removing power from DC bus 204 under the control of load power converter 206 as indicated by bi-directional arrow 244, (2) applying or removing power from energy storage device 210 under the control of battery power converter 212, and (3) by removing power from DC bus 204 by modulating the connection of dynamic brake resistor 214 to DC bus 204.

Figure 3:
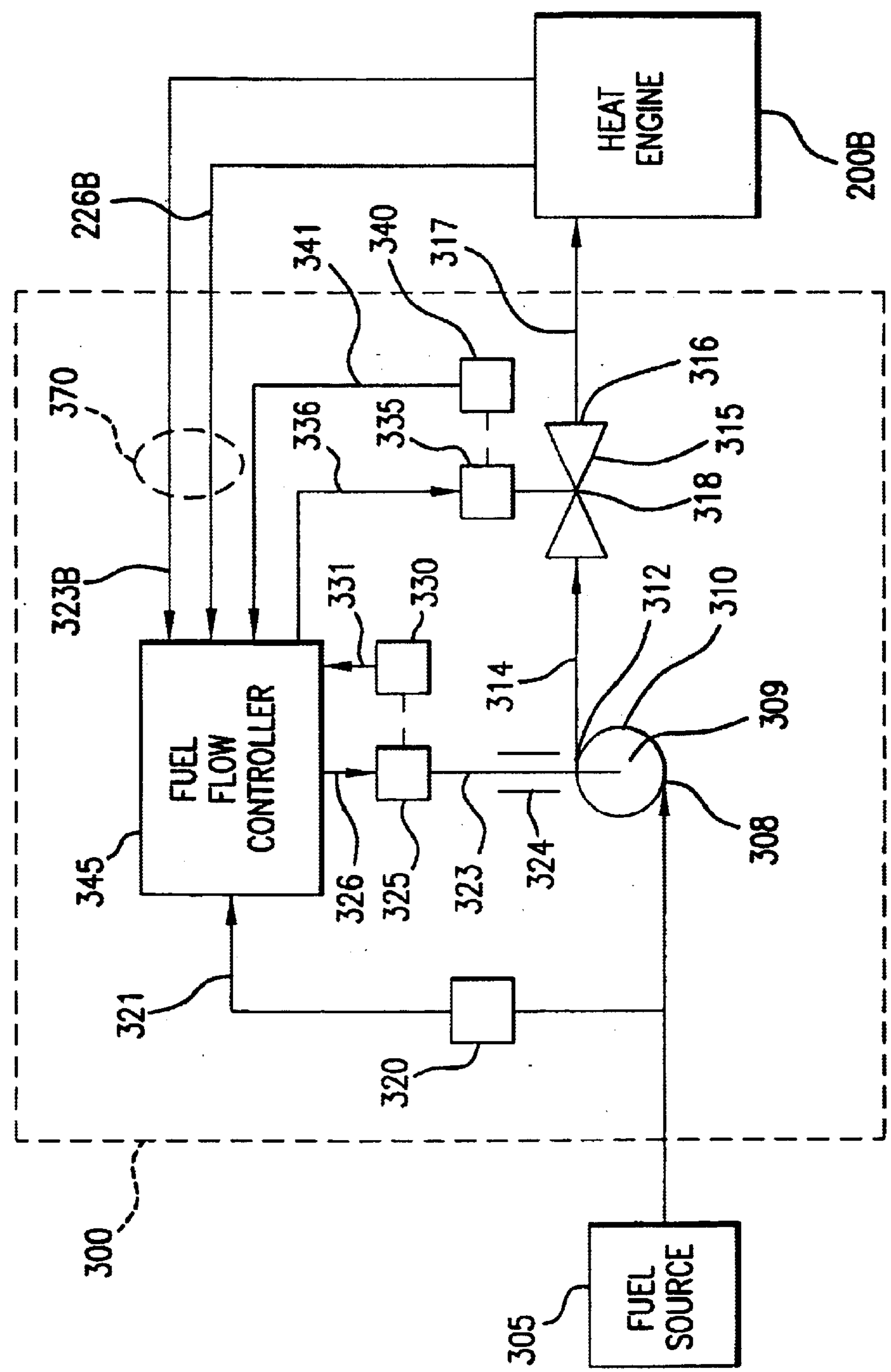
FIG. 3 is a block diagram of a fuel delivery system according to the present disclosure.

Referring now to FIG. 3, in a first embodiment fuel delivery system 300 supplies fuel 317 to heat engine 200B. Heat engine 200B may includes devices that consume fuel, generate heat, and produce a mechanical motion such as a reciprocating or rotary engine or a turbine engine such as turbogenerator 1.

Fuel delivery system 300 may include a fuel compressor 310, a fuel control valve 315, and a fuel controller 345. A pressurized discharge 312 of fuel compressor 310 may connect to an inlet 314 of control valve 315. Heat engine 200B may receive a fuel flow 317 from an outlet 316 of control valve 315. Fuel compressor 310 may have an inlet 308 connected to fuel supply 305. Fuel compressor 310 may be connected with a prime mover 325. Fuel compressor 310 may be a rotary flow compressor having a rotable assembly 323. The rotable assembly 323 of a rotary flow compressor 310 may be supported by one or more compliant foil fluid film bearings 324; compliant foil fluid film bearings 324 may limit speed range of compressor 310. Prime mover 325 may be an electric motor. Speed sensor 330 measures compressor speed 309. Control valve actuator 335 opens or closes control valve 315. Sensor 340 measures the stroke or opening 318 of control valve 315. Compressor safety sensor 320 measures compressor data which indicates safe or unsafe compressor operation. Compressor safety sensor 320 may be a pressure sensor that senses pressure at inlet 308 of fuel compressor 310. Sensor 320 may be a pressure switch or a vacuum switch set to one or more set point limits. Sensor 320 may be a pressure transducer or a vacuum transducer capable of measuring a range of pressures and vacuums. Fuel flow controller 345 exchanges information with measuring devices that may include compressor safety sensor 320 having connection 321 to fuel flow controller 345, speed sensor 330 having connection 331 to fuel flow controller 345, and valve stroke sensor 340 having connection 341 to fuel flow controller 345. Fuel flow controller 345 provides operating power or signals to compressor prime mover 325. Fuel flow controller 345 provides operating power or signals to control valve actuator 335. Fuel flow controller 345 may also receive feedback signals 370 from heat engine 200B. Feedback signals may include a temperature set point signal 232B and a feed back temperature signal 226B. Feedback signals 370 may be measured directly or they may be inferred.

Figure 4A:
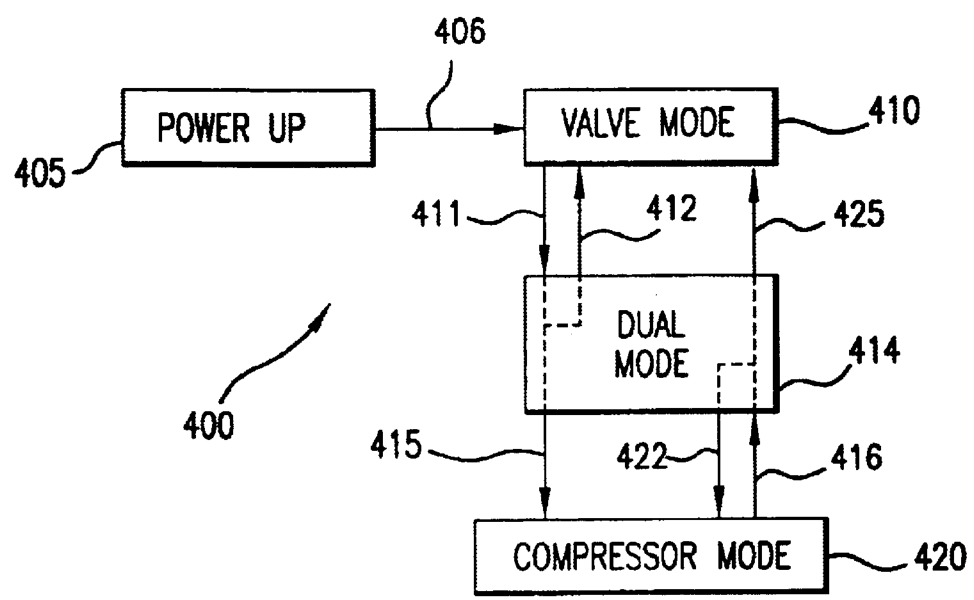
FIG. 4A is a mode transition diagram of a fuel delivery system according to the present disclosure.

Referring to FIGS. 3 and 4, in operation fuel delivery system 300 delivers varying amounts of fuel 317 to heat engine 200B in accordance with feed back signals 370 including measured temperature 226B. Fuel flow 317 increases when actuator 335 increases control valve stroke 318 or when motor 325 increases compressor speed 309. Fuel flow 317 decreases when actuator 335 decreases control valve stroke 318 or when prime mover 325 decreases compressor speed 309. Controlling fuel flow 317 primarily by varying stroke 318 of control valve 315 is referred to as valve mode 410. Controlling fuel flow 317 primarily by varying speed 309 of compressor 310 is referred to as compressor mode 420.

Figure 5:
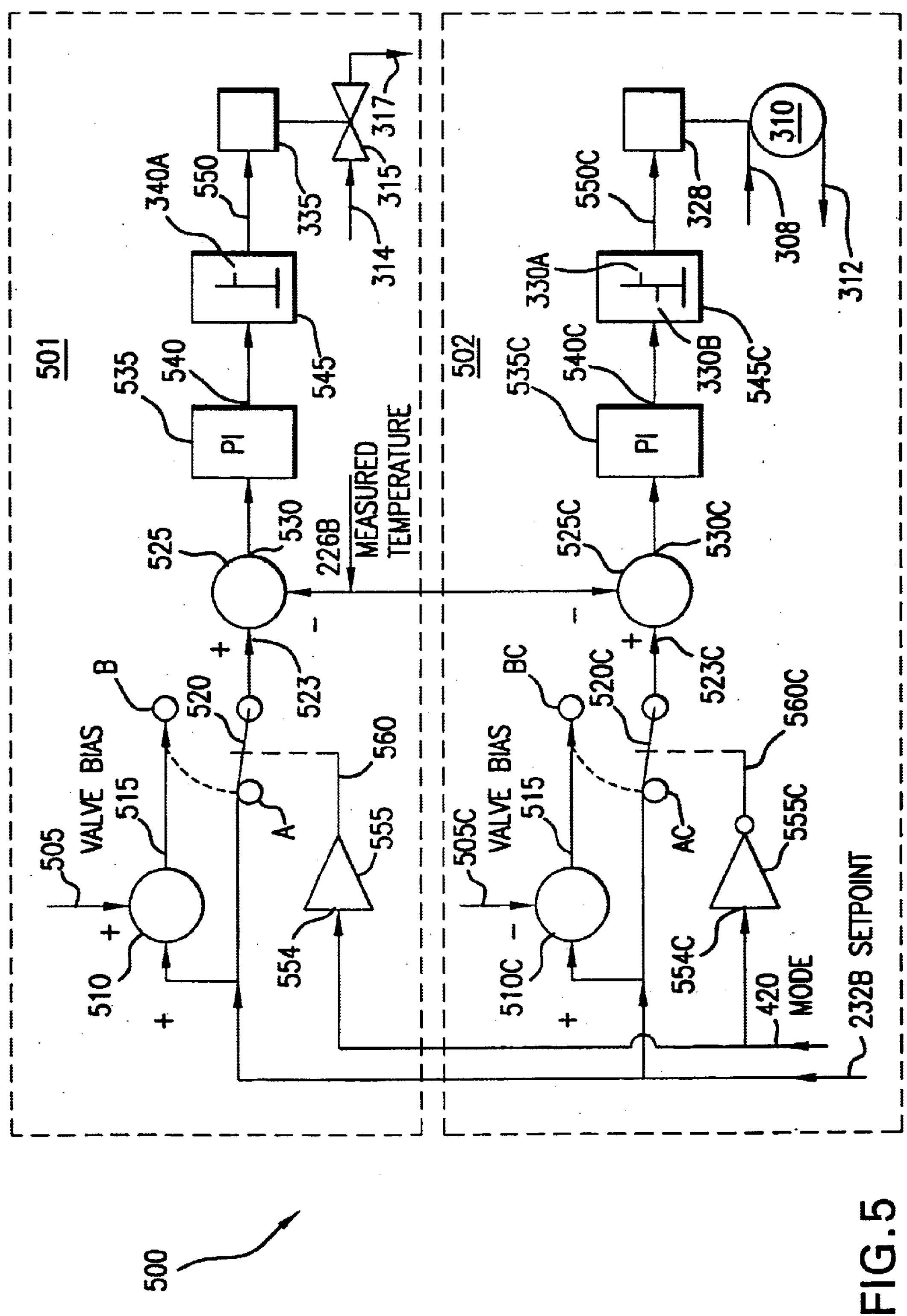
FIG. 5 is a block diagram of a fuel controller according to the present disclosure.

Referring now to FIGS. 3, 4, & 5, the fuel delivery system 300 is in compressor mode 420. Fuel compressor 310 may have a maximum speed limit 330A and a minimum speed limit 330B. The fuel flow 317 resulting from operation of fuel compressor 310 at a minimum speed limit 330B may exceed the fuel flow requirements of heat engine 200B. Excess fuel flow 317 to heat engine 200B may increase measured temperature 226B substantially above set point temperature 232B. Control valve 315 may be controlled based on a secondary set point 515 with a positive bias 505 on the primary set point 232B. Valve bias 505 may be chosen to cause a transition 416 to simultaneous control, referred to as dual mode 414, of both compressor speed 309 and valve stroke 318 in temperature range 506. Dual mode operation 414 ends and fuel control valve stroke 318 returns to a maximum open limit 340A and fuel delivery system 300 transitions 422 to compressor mode 420 if the fuel requirements of heat engine 200B increase and measured temperature 226B falls below secondary set point 515; this operation may occur in temperature region 504. Dual mode operation 414 ends and compressor speed 309 is controlled to a substantially constant minimum speed limit 330B and fuel delivery system 300 transitions 425 to valve mode 410 if the fuel requirements of heat engine 200B fall and measured temperature 226B exceeds set point 515C and compressor speed has reached a minimum limit 330B; this operation may occur in temperature region 506C.

Referring still to FIGS. 3, 4, & 5 the fuel delivery system 300 is in valve mode 410. Compressor 310 may be operating at a substantially constant speed near minimum speed limit 330B. In the event that the fuel requirements of heat engine 200B increase beyond the flow capability of fuel control valve 315, fuel control valve 315 may open to a maximum limit 340A and measured temperature 226B may fall below set point 232B. Compressor 310 may be controlled based on a secondary set point 515C with a negative bias 505C on the primary set point 232B. Compressor bias 505C may be chosen to cause a transition 411 to simultaneous control, referred to as dual mode 414, of both compressor speed 309 and valve stroke 318 in temperature range 504C. Dual mode operation 414 ends and fuel delivery system 300 transitions 412 to valve mode 410 if required fuel flow 317 of heat engine 200B decreases and measured temperature 226B exceeds secondary set point 515C; this may be operation in temperature region 506C. Dual mode operation ends and fuel delivery system 300 transitions 415 to compressor mode 420 if required fuel flow 317 of heat engine 200B increases and control valve 315 opens to a maximum limit 340A; this may be operation in temperature region 504.

Referring now to FIG. 4, the operating modes of fuel delivery system 300 include power up 405, valve mode 410, dual mode 414, and compressor mode 420. When the fuel delivery system 300 powers up, it may transition 406 to valve mode 410. Fuel delivery system 300 transitions 411 to dual mode 414 when measured temperature 232B equals or falls below a secondary set point 515 C. Fuel delivery system 300 transitions from dual mode 414 to valve mode 410 when measured temperature 232B rises above secondary set point 515C. Fuel delivery system 300 transitions 415 from dual mode 414 to compressor mode 420 when fuel control valve stroke 318 reaches a maximum limit 340A. When in compressor mode 420, fuel delivery system 300 may transition 416 to dual mode 414 when measured temperature 232B exceeds secondary set point 515. When in dual mode 414, fuel delivery system 300 may transition 422 to compressor mode 420 when measured temperature 232B exceeds secondary set point 515. When in dual mode 425, fuel delivery system 300 may transition 425 to valve mode 410 when compressor speed 309 equals or falls below a minimum limit 330B and measured temperature 232B exceeds a secondary set point 515.

Referring now to FIG. 5, fuel flow controller 345 comprises control logic 500 for determining valve command 550 and compressor command 550C. For the valve controller 501, temperature set point 232B is an input to summing junction 510 and to switch 520 contact A. Summing junction 510 sums temperature set point 232B and valve bias 505. An output of summing junction 510 is connected to contact B of switch 520. In compressor mode 420, mode line 420 is false. An input 554 of gate 555 is connected to mode line 420. Gate 555 conducts false input 420 and outputs false at an output 560 of gate 555. Switch 520 connects with contact B of switch 520 and set point 515 provided to difference junction 525 is biased by positive valve bias 505. In valve mode 410, mode line 420 is true. An input 554 of gate 5 is connected to mode line 420. Gate 555 conducts true input 420 and outputs true at an output 560 of gate 555. Switch 520 connects with switch contact B of switch 520 and set point 232B is provided to difference junction 525. Difference junction 525 provides a temperature error output 530 equal to the value of set point 523 minus the value of measured temperature 226B. Proportional integral controller 535 provides an output 540 based on temperature error input 530. Max limit controller 545 compares an output 540 of proportional integral controller 535 with a maximum limit 340A. The output 550 of max limit controller 545 may not exceed maximum limit 340A. Max limit controller 545 has a valve command output 550 that connects to fuel control valve actuator 335 that opens and closes fuel control valve 315 that has a fuel input 314 and an outlet flow 317.

Referring still to FIG. 5, the compressor controller 502 provides a second mode of control. For the compressor controller 502, temperature set point 232B is an input to difference junction 510C and to contact AC of switch 520C. Difference junction 510C provides a temperature set point 515C which is equal to the value of set point 232B minus the value of compressor bias 505C. An output of difference junction 510C is connected to contact BC of switch 520C. In valve mode 410, mode line 420 is false. An input 554C of inverter gate 555C is connected to mode line 420. Inverter gate 555C inverts true input 420 and outputs false at an output 560 of inverter gate 555C. Switch 520C connects with switch contact BC and set point 515C provided to difference junction 525C is biased by a negative compressor bias 505C. In compressor mode 420, mode line 420 is false. An input of inverter gate 555C is connected to mode line 420. Inverter gate 555C inverts false input 420 and outputs true at an output 560 of inverter gate 555C. Switch 520C connects with switch contact AC and set point 232B is provided to difference junction 525C. Difference junction 525C provides a temperature error output 530C equal to the value of set point 523C minus the value of measured temperature 226B. Proportional integral controller 535C provides an output 540C based on temperature error input 530C. Max-Min limit controller 545C compares an output 540C of proportional integral controller 535C with a maximum limit 330A and a minimum limit 330B. The output 550C of max limit controller 545C may not exceed maximum limit 330A or fall below the minimum limit 330B. Max limit controller 545C has a compressor command output 550C that connects to motor 325 that is rotably connected to compressor 310 that has a fuel input 308 and a fuel output 312.

Figure 6:
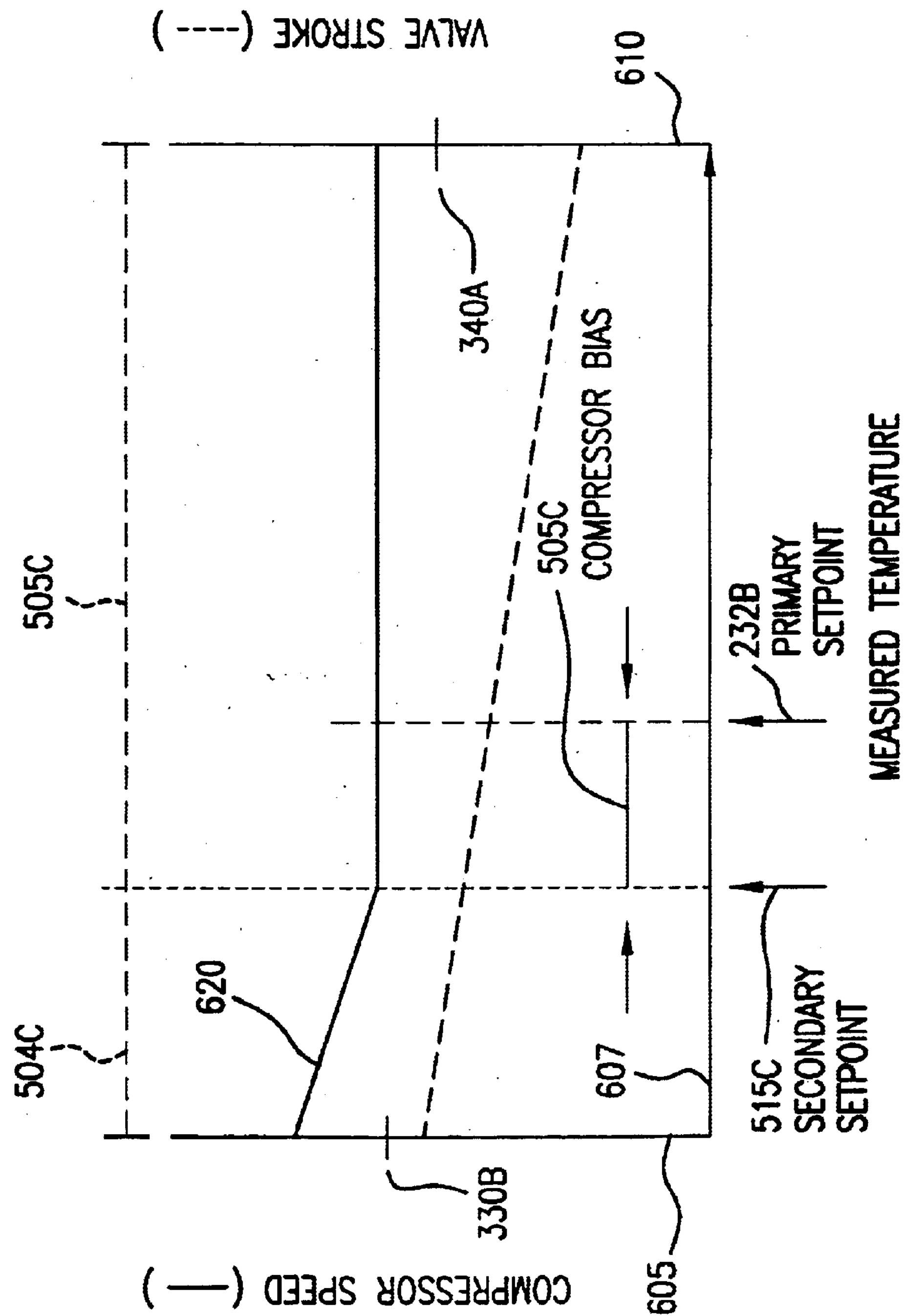
FIG. 6 is a temperature set point diagram of a fuel delivery system operating in valve mode according to the present disclosure.
Figure 7:
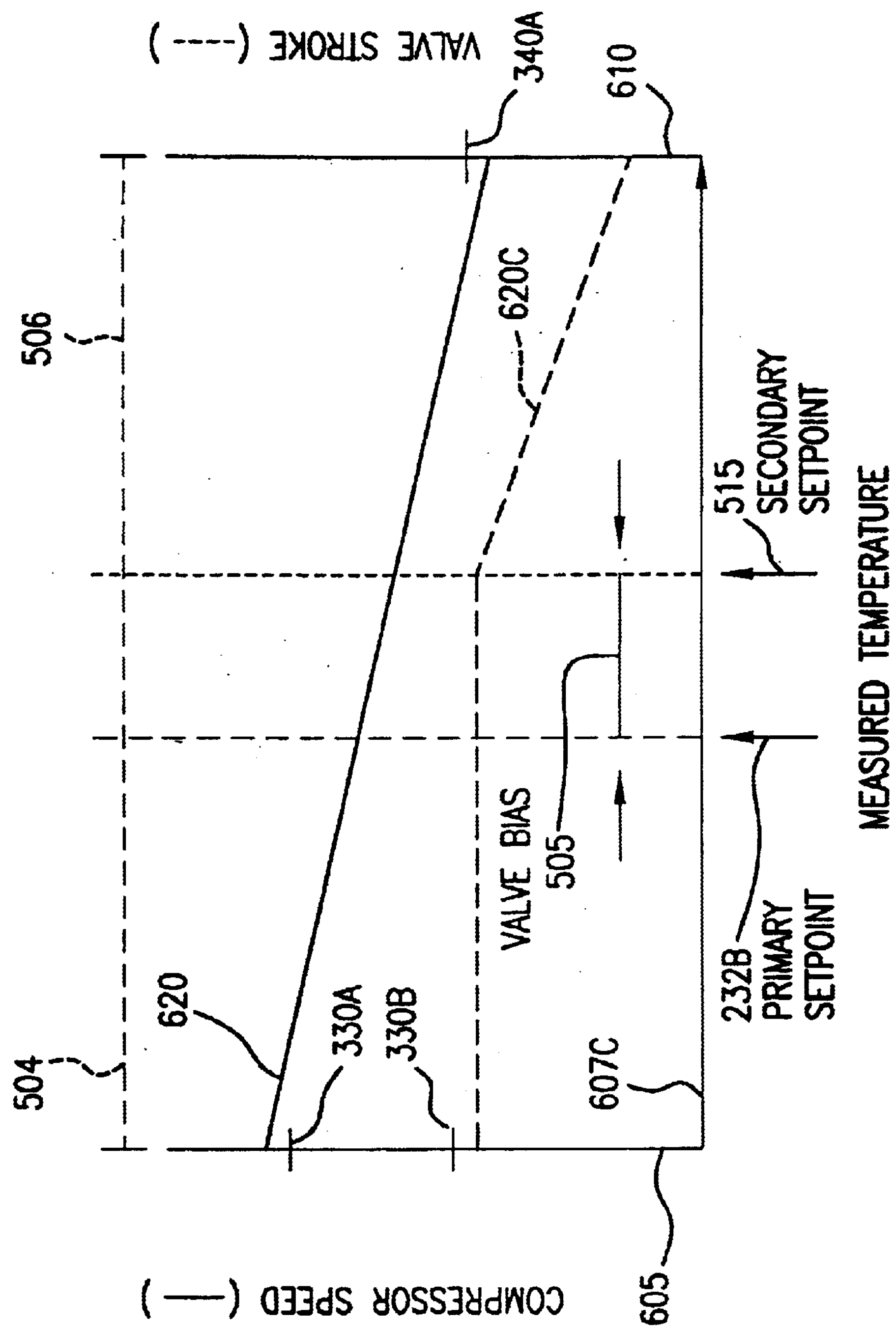
FIG. 7 is a temperature set point diagram of a fuel delivery system operating in compressor mode according to the present disclosure.

Referring now to FIGS. 6 & 7, illustrative temperature set point diagrams are shown for both valve mode 410, FIG. 6A and for compressor mode 420, FIG. 6B. FIG. 6A has a horizontal axis 607 that indicates measured temperature 226. A primary temperature set point 232B and a secondary temperature set point 515C is marked on the horizontal axis 607; each extends vertically and the horizontal distance between them indicates a negative bias, compressor bias 505C. The fuel control valve set point 232B is a primary set point and it may be unbiased. The secondary set point 515C has a negative bias 505C from the primary set point 232C and it is the compressor set point. Fuel control valve position 318 is indicated on a rightmost vertical axis 610. Valve position 318 is graphed as a dashed line against measured temperature 226. A valve position upper control limit 340A is shown. In valve mode 410, control of valve position 318 is the primary means of controlling fuel flow 317. Compressor speed 309 is indicated on a leftmost vertical axis 605. Compressor speed 309 is graphed as a solid line against measured temperature 226. Compressor speed 309 is substantially constant in temperature range 506C. Compressor speed 309 increases in temperature range 504C; this is dual mode operation.

Referring still to FIGS. 6 & 7, an illustrative temperature set point diagram for compressor mode 420 is shown in FIG. 6B. FIG. 6B has a horizontal axis 607C that indicates measured temperature 226. A primary temperature set point 232B and a secondary temperature set point 515 is marked on the horizontal axis 607C; each extends vertically and the horizontal distance between them is a positive bias, valve bias 505. The compressor speed set point 232B is the primary set point and it may be unbiased. The secondary set point 515 has a positive bias 505 from the primary set point 232C and it is the valve set point. Compressor speed 309 is indicated on a leftmost vertical axis 605C. Compressor speed 309 is graphed as a solid line against measured temperature 226. Upper 330A and lower 330B limits on compressor speed 309 are shown. In compressor mode 420, compressor speed 309 is primary means of controlling fuel flow 317. Fuel control valve position 318 is indicated on a rightmost vertical axis 610C. Valve position 318 is graphed as a dashed line against measured temperature 226. Valve position is substantially constant in temperature range 504. Valve position 318 decreases in temperature range 506; this is dual mode operation.

Referring now to FIGS. 2 and 3, in a second embodiment, fuel delivery system 300 supplies a fuel flow 317 to a turbogenerator 1. Fuel flow controller 345 may replace temperature controller 228C and fuel compressor 310 may replace fuel pump 50P. Measured temperature 226B is replaced by measured temperature 226, the temperature measured at the exit of turbine 30 by sensor 226S. Set point 232B is replaced by a set point 232.

In a third currently preferred embodiment, fuel compressor 310 is a rotary flow machine having a rotable assembly 323 that is supported by one or more compliant foil fluid film bearings 324. Fuel compressor 310 has minimum allowable speed 330B and associated fuel flow 317 that exceeds the requirements of turbogenerator 1 when operating at or near idle conditions.

In a fourth currently preferred embodiment, compressor bias 505C is a function of control valve position 318.

In a fifth currently preferred embodiment, compressor safety sensor 320 is a vacuum switch.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A fuel delivery system comprising:

a compressor;

a prime mover connected to the compressor;

a fuel valve having a controllable actuator, regulating fuel flow from the compressor;

one or more feedback elements providing one or more feedback signals; and a fuel controller receiving feedback signals from the one or more feedback elements and sending control signals to the fuel valve actuator and the prime mover for controlling the compressor speed and fuel valve position;

wherein said one or more feedback signals comprise compressor speed and fuel valve position.

2. The fuel delivery system of claim 1 wherein said one or more feedback signals further comprise:

a temperature signal from a heat engine connected to an output of said fuel valve.

3. The fuel delivery system of claim 1 wherein said compressor further comprises:

a rotary flow compressor having a housing and a rotatable assembly.

4. The fuel delivery system of claim 3 wherein said rotary flow compressor further comprises:

compliant foil fluid film bearings supporting said rotatable assembly.

5. The fuel delivery system of claim 4 further comprising:

a vacuum measuring device connected to the compressor intake.

6. The fuel delivery system of claim 5 wherein said one or more feedback signals further comprise:

a compressor safety signal from said vacuum measuring device.

* * * * *